United States Patent [19]

Mahoney et al.

[11] Patent Number: 4,896,035
[45] Date of Patent: Jan. 23, 1990

[54] HIGH MASS ION DETECTION SYSTEM AND METHOD

[75] Inventors: John F. Mahoney, South Pasadena; Julius Perel, Altadena, both of Calif.

[73] Assignee: Phrasor Scientific, Inc., Duarte, Calif.

[21] Appl. No.: 181,816

[22] Filed: Apr. 15, 1988

Related U.S. Application Data

[63] Continuation-in-part of Ser. No. 82,785, Aug. 6, 1987, Pat. No. 4,835,383.

[51] Int. Cl.⁴ .............................................. H01J 43/00
[52] U.S. Cl. ..................................... 250/309; 313/542
[58] Field of Search ........... 250/281, 282, 283, 423 R, 250/309; 313/542, 520, 103 CM

[56] References Cited

U.S. PATENT DOCUMENTS

| | | | |
|---|---|---|---|
| 3,478,213 | 11/1969 | Simon et al. | 313/528 |
| 3,914,136 | 10/1975 | Kressel | 313/542 |
| 3,960,620 | 6/1976 | Ettenberg | 313/542 |
| 4,019,082 | 4/1977 | Olsen et al. | 313/532 |

*Primary Examiner*—Bruce C. Anderson
*Attorney, Agent, or Firm*—Spensley Horn Jubas & Lubitz

[57] ABSTRACT

An improved ion detection system and method for detection of low or high mass ions. A target having a low work function, photoemissive surface layer is employed to fragment the incident ions and produce secondary negative ions and electrons. The target surface preferably is formed of a thin layer of an alkali antimonide compound, bialkali antimonide compound, multi-alkali antimonide compound, cesiated III - V semiconductor compound, or other photoemissive material having a relatively low band gap energy and electron affinity. Additionally, the photoemissive material should have a low thermionic emission level at room temperature to reduce noise levels in the detector. The secondary ions and electrons may be detected by a conventional electron multiplier detector. The potential difference between the target surface and electron multiplier detector is chosen to accelerate the secondary ions and electrons to the electron multiplier detector with an energy corresponding to high detection efficiency.

20 Claims, 5 Drawing Sheets

HIGH MASS ION DETECTION SYSTEM AND METHOD

RELATED APPLICATIONS

This is a continuation-in-part of pending application Ser. No. 07/082,785 filed Aug. 6, 1987. Pat. No. 4,835,383.

BACKGROUND OF THE INVENTION

1. Field of the Invention

The present invention relates to mass spectrometry. In particular, the present invention relates to ion detection systems for mass spectrometry of biomolecules and other high molecular weight substances. Additionally, the present invention relates to improved ion detection systems for low molecular weight substances.

2. Background of Related Art

Accurate mass analysis of substances covering a wide range of molecular mass values is of increasing importance. In particular, accurate determination of molecular weights of proteins, and other biomolecules, is of paramount importance in biochemistry and modern biology. The molecular weight of a protein indicates its size, the possible presence of subunits (polymeric and monomeric molecular weights), and gives a rough idea of the number of component amino acids. An accurate method of high mass molecular weight determinations for proteins would be of special importance to the biotechnology field, since even rare proteins are now available by recombinant DNA techniques, and the first criteria of identity from batch to batch is the molecular weight of the protein.

In general, proteins range in molecular weight from 10,000 to 500,000 amu, but this range can be extended to include peptides (below 10,000 amu), or certain multimeric proteins (over 500,000 amu). At present, however, no accurate and efficient means is available for determination of biomolecular mass for the higher portion of the protein mass range, and in particular, for masses from 10,000 to 500,000 amu.

Determination of protein molecular weights by current methodologies, such as sedimentation, molecular sieving, gel electrophoresis, etc., present various special problems. The method of choice for determining protein molecular weights (weight average) has been sedimentation techniques in the ultracentrifuge. However, these techniques are technically cumbersome, slow and require the determination of other physical properties such as the partial specific volume of the protein. The accuracy of these methods can sometimes be as precise as to 10,000 amu, but more often are subject to much greater errors.

Mass spectrometry is one potential method for providing accurate determination of molecular weight of biomolecules and other molecules spanning a broad mass range. Mass spectrometry employs three functional aspects: sample ionization, mass analysis and ion detection. Progress has been achieved in all three major areas of mass spectral analysis. As a result reasonably effective measurements of certain biomolecules of mass below 10,000 amu have been achieved. Mass measurements for proteins as large as 25,000 amu have also been made using plasma desorption mass spectrometry. Nevertheless, the majority of protein structures have molecular weights from 10,000 to 200,000 amu and the need thus exists for new and improved methods in mass spectrometry to extend the range of mass analysis.

Figure 1:
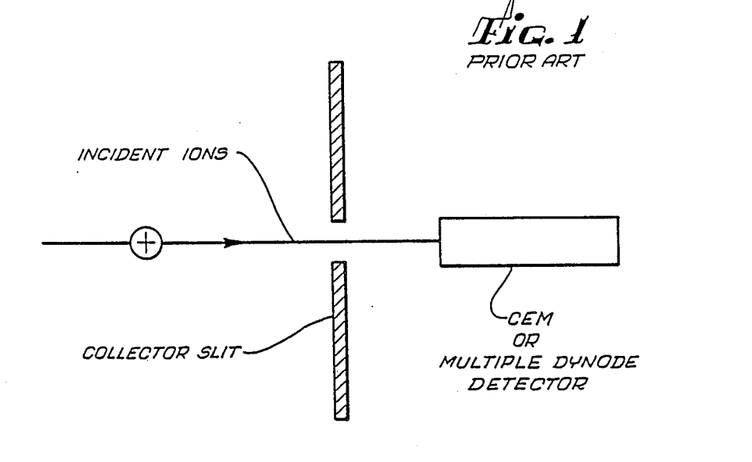
FIG. 1 is a schematic drawing of a prior art ion detection system used in mass spectrometry.

Presently available ion detection systems are not capable of efficient detection of ions in the mass range of from 10,000 to 500,000 amu, and in particular in the range of from 25,000 to 500,000 amu. Conventional means for detecting ions employed in mass spectrometry employ the impact of the ions at high velocity on a surface with the subsequent ejection of secondary electrons. These secondary electrons are detected by an electron multiplier resulting in an amplified signal pulse. Perhaps the most widely adopted method for the detection of low mass ions in mass spectrometry is the Channeltron Electron Multiplier (CEM), illustrated schematically in FIG. 1. This uses the direct impingement of incident ions on the surface of the detector to produce secondary electrons. Problems for the detection of high molecular weight ions derive from the well-known measured characteristics of these devices; in particular the reduction in the gain of CEM's with increasing M/Z of the bombarding ion. Now widely accepted, the phenomenon is attributed to the low yield of secondary electrons ejected by slow-moving, high mass molecules. R. J. Beuhler and L. Friedman, *Threshold Studies of Secondary Electron Emission induced by Macro-Ion Impact on Solid Surfaces*, Nucl. Instrum. Meth., 170, 309 (1980). Below a certain threshold velocity, detection may not be possible at all.

In an attempt to avoid the limitations on the primary ion source accelerating voltage, post-acceleration of the ions was introduced to increase the velocity of high mass ions. One approach to providing post-acceleration employs application of high voltages across the electron multipliers to accelerate the ions above the threshold. This is impractical, however, for voltages in excess of 3 to 4 kV due to intolerably low signal-to-noise levels. The disadvantages of such systems also include size, cost and complexity associated with bringing detector signals at high voltage to ground potential.

Figure 2:
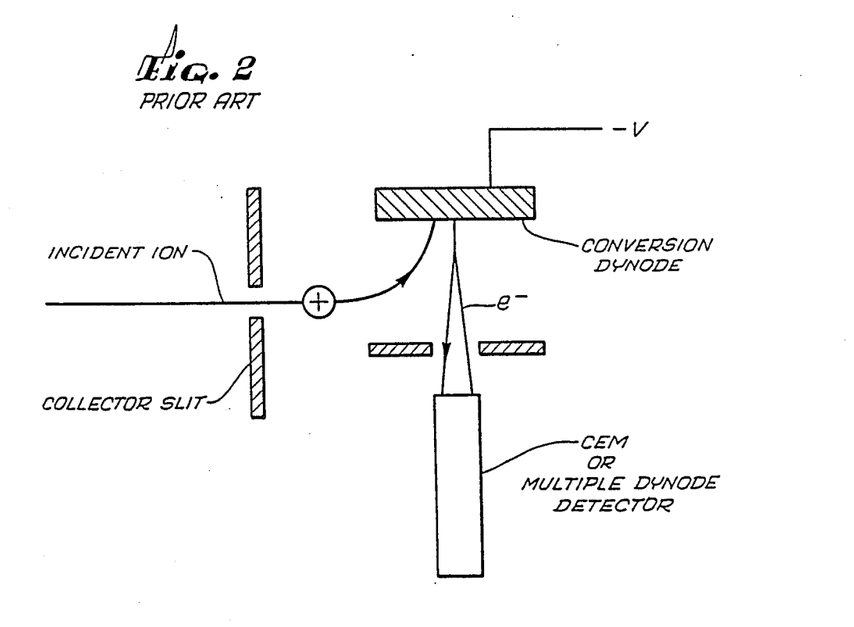
FIG. 2 is a schematic drawing of a prior art post acceleration ion detection system.

Another approach to post-acceleration ion detection for mass spectrometry is illustrated in FIG. 2. Post-acceleration of incident ion beams is provided by an intermediate conversion electrode (dynode) which can operate at high voltages. This circumvents one of the major problems associated with floating detectors at high voltages; for example, coupling the detector output signal to ground level electronics. Instead of directly bombarding the detector surface, the primary ions impact the dynode surface with an energy given by the voltage (V):

$$V = V_a + V_d$$

where $V_a$ is the ion source accelerating voltage and $V_d$ is the voltage applied to the dynode. Secondary electrons and negative ions ejected from the dynode surface are subsequently detected by conventional multipliers. Detection of high mass ions (50,000–100,000 amu) by post-acceleration methods will require dynode voltages of the same magnitude.

Various post-acceleration detector configurations have been reported and are commercially available from some manufacturers of magnetic instruments. One such detector is manufactured by JEOL Ltd. and is described in *Evaluation of Post Acceleration Type High Sensitive Ion Detector For Mass Spectrometer*, JEOL New, 21A (No. 2), 34 (1985).

Figure 3:
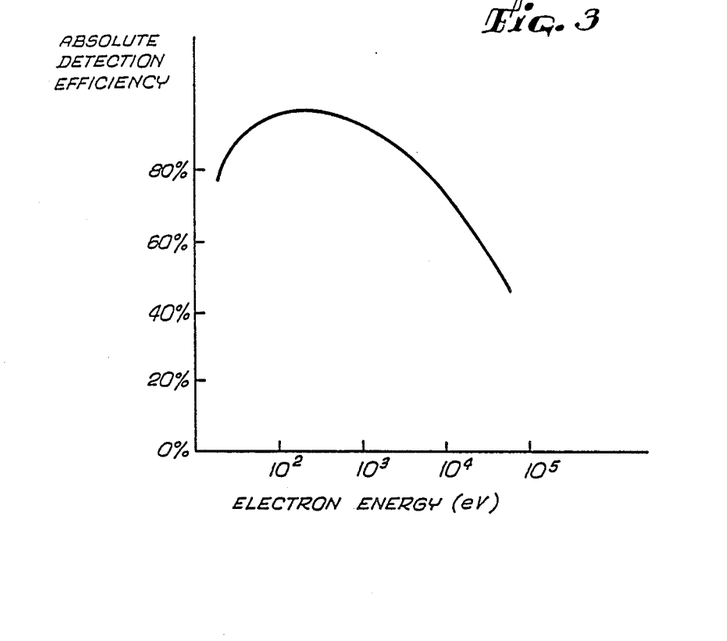
FIG. 3 is a graph illustrating the dependence of detection efficiency of a detector, such as shown in FIGS. 1 or 2, upon electron energy.

One disadvantage of post-acceleration detectors, related to the energy of the electrons impinging on the final detector surface, represents a form of "Catch-22" for detector efficiency. High dynode voltages are required to accelerate high mass ions to an energy sufficient to produce secondary electrons, however, for high dynode voltages, the secondary electrons impinge on the multiplier with energies higher than the energy for maximum detection efficiency. This is illustrated by FIG. 3 which shows the CEM response as a function of the incident electron energy. (Taken from E. Kurz, *Channel Electron Multipliers*, American Laboratory (March 1979).) Inspection of FIG. 3 shows that for electrons of energy E=40 KeV, the detection efficiency has dropped to approximately 60% from a peak of 90% at E=500 eV. Therefore, the gain in secondary emission at the conversion dynode is offset in part by the decrease in detector efficiency at the higher incident electron energies.

Another disadvantage of post acceleration, ad other detectors, is that to detect negative sample ions, existing detectors must rely on the ejection of lower yield, secondary positive ions. Consequently the detection of high mass, negative ions is usually less sensitive than the detection of positively charged high mass ions. One approach to a post acceleration positive ion detector is shown in U.S. Pat. No. 4,423,324 to Stafford.

Various other approaches have been attempted to resolve one of more of these problems. E.g. N. R. Daly, *Scintillation Type Mass Spectrometer Ion Detector*, Rev. Sci. Instrum., 31, 264 (1960); I. Katakuse, H. Nakabushi, T. Ichhhara, Y. Fujita, T. Matsuo, T. Sukurai and H. Matsuda, *Post Acceleration For Heavy Molecule Ion Detector*, Mass Spectrometry, 33, 145 (April, 1985). The usefulness of such approaches for yielding effective high mass resolution has not been demonstrated, however.

Thus, prior art efforts to increase the efficiency of high mass ion detection in mass spectrometry instruments have been directed to post dynode signal amplification techniques and to increasing ion acceleration voltages at the source.

SUMMARY OF THE INVENTION

The present invention provides an improved ion detection system and method having increased sensitivity in detection of ions by employing amplification of secondary negatively charged particle production at the conversion dynode in addition to providing post dynode amplification. This results in a net amplification of the ion detection signal which is multiplicative; i.e., if $A_1$ denotes the amplification provided at the conversion dynode and $A_2$ the amplification provided at the post dynode stage, the net amplification is $A_1 \times A_2$.

The present invention provides an improved ion detection system and method employing the detection of secondary negative ions and electrons produced by the impact of incident ions on a low work function, photoemissive target surface. The low work function characteristics of the target surface enhance negative fragment ion formation. The photoemissive characteristics of the target surface provide an enhancement of secondary electron production due to absorption of photons generated by the collision of the ions with the target surface. Such photons are generated by several mechanisms and may increase the secondary electron yield for detection purposes, particularly for larger mass ions.

The ion detection system of the present invention is employed in conjunction with a source of ions. The ion beam is collimated by a slit and accelerated to the target dynode by a predetermined bias potential applied to the dynode, which potential is chosen to be negative or positive depending upon the polarity of the incident ions. The dynode includes a dynode surface coated with a photoemissive material. The photoemissive material is preferably chosen to have a relatively small band gap and electron affinity, resulting in a low work function. Additionally, the photoemissive material preferably has a low thermionic emission level at room temperature to reduce noise in the detector. Alternatively, the dynode surface may be cooled to reduce thermionic emission. A number of photoemissive materials satisfy these general requirements, such materials including alkali antimonides, bialkali antimonides, multi-alkali antimonides and cesiated III-V semiconductor compounds. In a preferred embodiment the photoemissive material is chosen to have a band gap energy within the range 1-2 eV, an electron affinity of less than 1 eV, and a thermionic emission of less than $10^{-14}$ A/cm$^2$ at room temperature. The low work function, photoemissive dynode surface results in enhanced yields of electrons which add with the secondary negative fragment ions to provide an amplified signal from the dynode.

A conventional electron multiplier detector may be employed to detect the secondary fragment ions and electrons. These secondary negatively charged particles are accelerated from the target to the electron multiplier detector by the difference in bias potential of the target and electron multiplier detector. Due to the relatively low mass of the secondary fragment ions and electrons, these secondary negatively charged particles are accelerated to a velocity sufficient to create a strong signal on the electron multiplier detector.

DESCRIPTION OF THE PREFERRED EMBODIMENT

Figure 4:
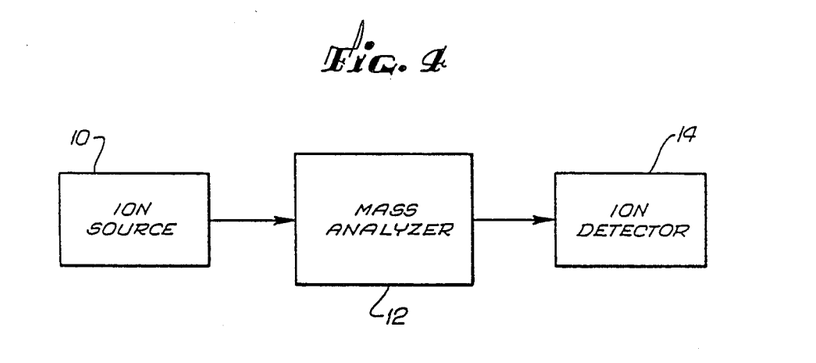
FIG. 4 is a schematic drawing of a mass spectrometer incorporating the present invention.

FIG. 4 illustrates schematically the structural features of a mass spectrometer employing the high mass ion detection system of the present invention. A beam of ions (positive or negative) is provided by an ion source 10. In one application of the ion detection system of the present invention the ion beam may be composed of ions which dissociate on impact to provide fragments with high electron affinities. Biomolecules possess such high electron affinity constituent atoms and molecules, therefore in one preferred application a beam of biomolecular ions is provided by ion source 10. Several types of ion sources suitable for providing a beam of biomolecular ions are described in A. Benninghoven, ed., *Ion Formation From Organic Solids*, Springer-Verlag (1983), pp. 32 and 90. Due to the increased sensitivity of the detector of the present invention, the ion source acceleration voltage may be considerably less than that required for other high mass ion detection systems.

Figure 5:
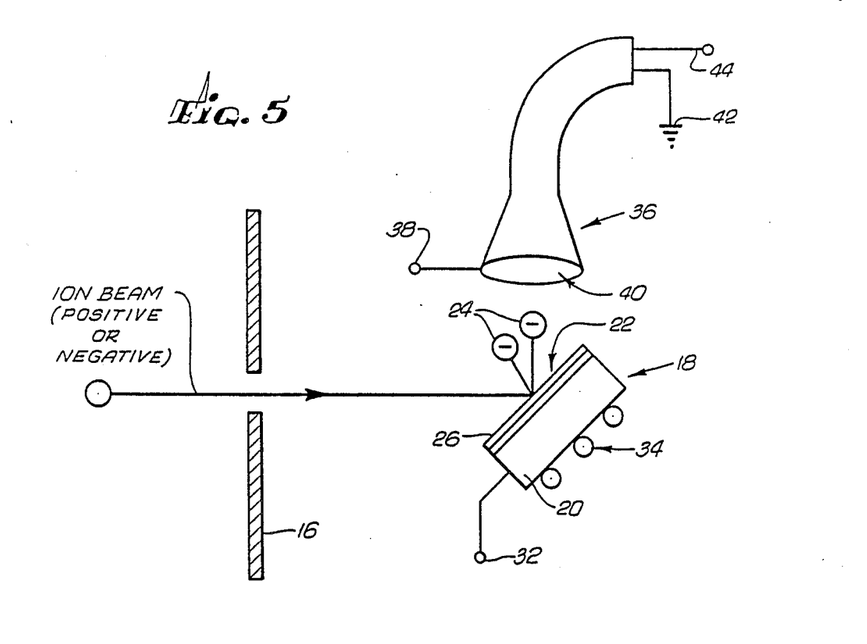
FIG. 5 is a schematic drawing of the ion detection system of the present invention.

Before arriving at the high mass ion detection system, illustrated in FIG. 5, the ion beam passes through a mass analyzer 12, shown in FIG. 4, which separates the ions based on their charge to mass ratios. Such mass analyzer 12 may be of the quadrupole type, magnetic sector type, or time of flight (TOF) type. Both the quadrupole and magnetic sector mass analyzer systems have inherent limitations, however, due to the requirements of increased mass analyzer size for increased ion mass. Accordingly, a TOF mass analyzer is preferred for very high mass biomolecule spectrometry. Such a suitable TOF mass analyzer is described in Erich W. Blauth, *Dynamic Mass Spectrometers*, Elsevier (1965), p. 71. Quadrupole and magnetic sector analyzers may also be employed, however, and are described at p. 140 and p. 1 of Blauth, respectively. After leaving the mass analyzer 12 the ion beam arrives at the detector 14. In, for example, a TOF system, the timing of the signal from the detector 14 will serve to indicate the mass of the ions.

Referring to FIG. 5, a preferred embodiment of the ion detection system 14 of FIG. 4 is shown. The incident ion beam provided from the ion source 10 and mass analyzer 12 first passes through a detector slit 16 shown in FIG. 5. The detector slit serves to collimate the ion beam and to shield portions of the detector from the beam. Various detector configurations may require modification of the position and shape of the detector slit 16.

After passing through the detector slit 16, the ion beam impacts on the target dynode 18. Dynode 18 comprises a dynode substrate 20 with a planar first major surface 22 configured so as to intercept the ion beam. Dynode substrate 20 may be composed of a suitable hard metal such as Ti, W, Cu, Al, Au, Ni, Mo and stainless steel.

Upon impacting the dynode surface 22, the incident ions will fragment, i.e. dissociate into various size constituents. The extent of fragmentations will depend largely upon the incident ion impact energies, however, for high mass ions significant fragmentation will occur for even relatively low impact energy. For incident ions having high electron affinity constituents, such as biomolecules, the fragments will have a tendency to become negatively ionized irrespective of the charge on the incident ion beam. Such negatively charged ions may be backscattered upon collision or may be later desorbed from the dynode surface 22 by subsequent collisions. Also, the impact of the ions will cause electrons to be given off from the dynode surface 22. Such backscattered and desorbed ions and electrons are collectively illustrated in FIG. 5 as negative charges 24 being emitted from target surface 22.

The dynode surface 22 is coated with a partial layer 26 of a low work function, photoemissive material. The photoemissive surface 26 provides a means of producing secondary photoemitted electrons in addition to the kinetically ejected secondary electrons produced by impact of the ions on the dynode. Several types of photoemissive materials are suitable for increasing the yield of electrons from dynode 18. As discussed in more detail below, such photoemissive materials include alkali antimonide compounds, bialkali antimonide compounds, multi-alkali antimonide compounds and negative electron affinity (NEA) materials such as cesiated III - V semiconductor compounds. As described in more detail below, the properties of such a low work function photoemissive layer 26 on the dynode surface 22 provides an amplification of the signal from dynode 18.

The dynode substrate 20 is coupled to a dynode biasing potential 32. The dynode biasing potential will be positive or negative depending upon the charge of the incident ions. A potential of $-2.5$ kV would be suitable for incident positive ions and a potential of $+2.0$ kV would be suitable for incident negative ions.

The dynode 18 is optionally provided with a means 34 for cooling the dynode 18 to a predetermined temperature. The optimum temperature for detector efficiency is interrelated with the thermionic emission characteristics of the dynode surface layer 26. A suitable temperature range for the dynode 18 is chosen which provides a background electron emission level of $10^{-14}$ A/cm$^2$ or less, which would correspond to an acceptable signal to noise level. This temperature range will vary with the specific material employed for the surface layer 26. For photoemissive materials on surface layer 26 with sufficiently low thermionic emission levels at room temperature, cooling means 34 may be replaced with a heater to enhance the electron emission due to localized heating of the surface layer 26 during ion collisions.

The secondary negative ions and electrons 24 emitted from dynode surface 22 are detected by detector 36, which may be CEM (Channeltron Electron Multiplier) detector. The CEM detector 36 may be of a type manufactured by Galileo Electro Optics Corp. such as their model 4000 Series. The CEM detector 36 is preferably positioned in a manner such that it is shielded from the incident ion beam by shield 16 and is only a few centimeters from target 18.

The CEM detector operates in a conventional manner, i.e., ions and electrons impacting on a target at the anode end 40 of the detector 36 trigger an avalanche of secondary electrons which is multiplied through repeated collisions within the detector 36. The detector anode biasing potential 38 is chosen to provide a potential difference between the anode end 40 of the detector 36 and the dynode 18 which is sufficient to accelerate the low mass negative fragment ions 24 to velocities above the threshold for detection and electrons to an energy corresponding to their maximum detection efficiency. Such energy should thus correspond generally to the peak shown in FIG. 3, i.e., approximately 500 eV.

Therefore, for a −2.5 kV target potential (suitable for positive incident ions), the detector biasing potential 38 may be chosen to be approximately −2.0 kV for detection of secondary electrons. Other biasing potentials may be chosen to optimize the simultaneous detection of both secondary electrons and negative ions. The cathode end of CEM detector 36 will preferably be coupled to ground 42. A detection signal will be provided along line 44 in a conventional manner.

For negative incident ions, the target 18 should be maintained at a positive bias potential 32, for example, +2.0 kV. The anode end 40 of detector 36 should then be biased more positive, for example, by an anode biasing potential 38 of +2.5 kV. Cathode potential 42 should then be approximately +4.5 kV. Unlike conventional post-acceleration ion detectors, however, for either positive or negative incident ions efficient production of secondary ions will be provided. Also, there is no problem in accelerating the secondary ions and electrons to velocities exceeding the threshold required to eject secondary electrons upon impact with CEM detector 36, due to the very low mass of the secondary fragment ions and electrons.

Figure 6:
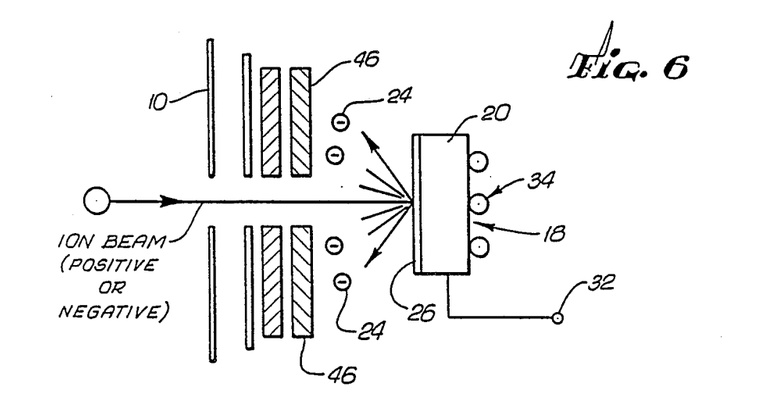
FIG. 6 is a schematic drawing of an alternate configuration of the ion detection system of the present invention.

Referring to FIG. 6, an alternate embodiment of the ion detection system of the present invention is shown. The detection system of FIG. 6 differs from that of FIG. 5 in that target 18 is positioned perpendicular to the direction of the ion beam rather than at an angle as shown in FIG. 5. Also, an annular, on-axis CEMA (Channeltron Electron Multiplier Array) detector 46 is employed in place of the off-axis detector 36 of FIG. 5. The CEMA detector 46 may be of the type manufactured by Galileo Electro Optics Corp., such as their model LPD-25. The configuration of FIG. 6 may be advantageously employed in applications where space limitations are present.

As mentioned above, in contrast to conventional ion detectors, the high mass ion detection system of the present invention exploits the physio-chemical properties of the ion beam as well as the electronic material properties of the target surface 22 to amplify the signal provided at dynode 18. In particular, negative fragment ion production and photoelectron production is enhanced.

The negative fragment ion production efficiency is a function of the difference between the work function ($\phi$) of the impacted surface and the electron affinity ($E_a$) of the fragmented species: ($\phi$- $E_a$). Therefore, a low work function dynode surface 26 may be combined with an atom or molecule with high electron affinity to optimize negative fragment ion formation. Target heating may also enhance negative ion and electron production efficiency, however, as noted above such heating is limited by noise levels due to thermionic emission characteristics of the material employed for dynode surface layer 26.

The significance of low work function dynode surface materials and incident ion electron affinity on negative ion conversion efficiency relates to the physical processes underlying negative ion formation on the target surface 22. Negative ions can be generated from ion beams incident on surface layer 26 through one or more surface conversion processes. The conversion processes most significant in detecting high mass ions are the following:

(1) Desorption of negative ions (e.g. H−, OH−, O−, $O_2^-$), present as background impurities or residual fragments from prior biomolecule deposition, from the surface by energetic ion impact.

(2) Backscattering or reflection of secondary particles from the surface in the form of negative ions after dissociation or fragmentation of biomolecular ions.

(3) Electron production by thermionic emission from the target surface.

Figure 7A:
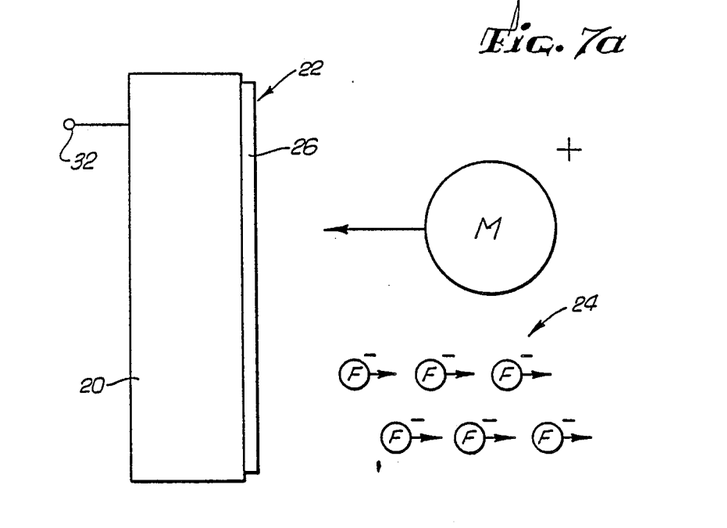
FIG. 7a is a schematic drawing illustrating secondary negative fragment ion formation by ion collision with a low work function surface.

By combining a surface of low work function with an incident ion species having high electron affinity constituents, the negative ion production efficiency is enhanced. Such secondary negative ion formation by fragmentation is illustrated in FIG. 7(a).

Figure 7B:
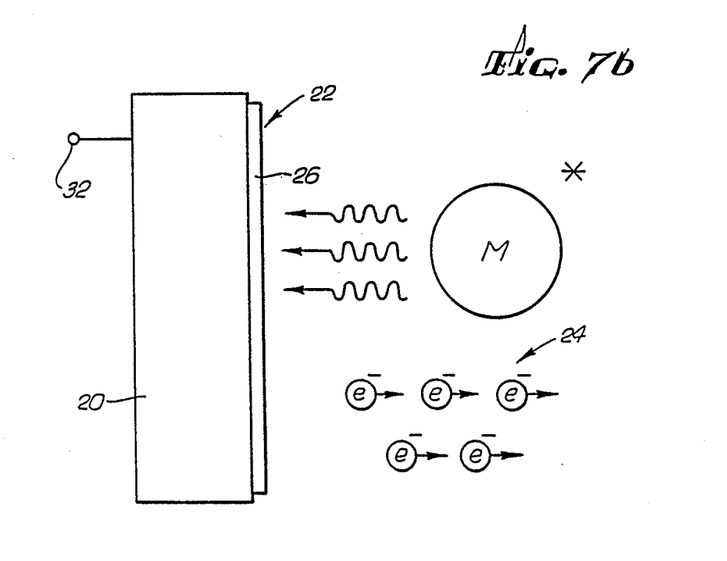
FIG. 7b is a schematic drawing illustrating secondary electron formation by photoemissive processes at the dynode surface coated with a photoemissive material.

A fourth category of conversion process may also be exploited to provide further amplification of the negative signal from the dynode 18. This category of conversion process is electron emission by absorbtion of photons emitted from molecules excited during the collision. This category of conversion process has not been recognized as a significant process for secondary electron formation in prior art ion detection systems, however. A significant amount of the collision energy of the ion beam can be converted to excitational modes of the ion or its fragments. These excited modes will then rapidly decay by emitting photons. These photons may be captured and converted to secondary electron production at the dynode surface 22 which is coated with a photoemissive material. This additional process of secondary electron formation is illustrated in FIG. 7(b).

Secondary photoemitted electrons can be produced at the dynode surface 22 by several mechanisms, including the following:

1. Large biomolecular ions which impact the dynode without fragmentation (backscattered or reflected) may reach excited states derived from the impact energy. This excess energy is radiated by emitting photons. The photons, in turn, strike the target surface 26 releasing photoemitted electrons.
2. Optical emissions may also be induced by radiation from excited molecules adsorbed on the target surface 26.
3. The fragmentation products of large incident ions may also be in excited states and subsequently undergo optical radiation.

All these mechanisms for producing secondary photo-electrons are greatly enhanced by coating dynode surface 22 with a layer 26 of photoemissive material.

As discussed above, to take advantage of the negative fragment formation processes, the layer of photoemissive material 26 should also have a low work function. Most known photoemissive materials are semiconductors having an effective work function, approximately equal to the sum of the band gap energy ($E_G$) and electron affinity ($E_A$), which is quite low. Also, the low work function photoemissive material must have a sufficiently low thermionic emission level such that noise due to such emission will not result in net degradation of the signal. This latter restriction may be alleviated by cooling dynode 18, however. Preferred ranges for these parameters are: a band gap of from 1–2 eV, an electron affinity of less than 1 eV, and a thermionic emission of less than $10^{-14}$ A/cm$^2$ at 25° C.

Table 1 lists a number of known photoemissive materials, along with their band gap energy, electron affinity and thermionic emission levels where known. In Table 1, the listed photoemissive materials have been divided into 5 categories: alkali antimonide compounds; bialkali antimonide compounds; multi-alkali antimonide compounds; cesiated III - V semiconductor compounds; and other photoemissive materials. Preferred materials include: GaAs:CsO; InGaAs:CsO; (Cs)Na$_2$KSb; Na$_2$KSb and K$_2$CsSb due to their combination of low work function and good photoemissive properties. As may be seem from Table 1, several other bialkali antimonides and multialkali antimonides also fall within the preferred ranges of $E_G$ and $E_A$. Additionally, the cesiated III - V compounds are characterized by negative electron affinity and also have low effective work functions making them suitable as well although cooling of such materials may be required to reduce thermionic emission. Also, Cs$_2$O:Cs$_2$O$_2$ is a suitable material due to its low work function (approximately 1 eV) and good photoemissive properties. The remaining photoemissive materials may also be employed, however, with somewhat reduced signal enhancement.

Additionally, the band gap energy and electron affinity, and hence effective work function and photoemissive properties, of the materials listed in Table 1 may be modified by adjusting the stoichiometries of the constituent compounds to alter the doping level of the majority carriers of the semiconductive material. For example, normal cesium oxide, Cs$_2$O, is a semiconductor having a band gap energy of 2.0 eV and an electron affinity of 0.8 eV, leading to an expected work function of approximately 2.8 eV. However, Cs$_2$O:Cs$_2$O$_2$ with low (impurity level) concentratior's of Cs$_2$O$_2$ has a measured work function of approximately 1 eV. This difference is believed to be due to a donor level, from the Cs$_2$O$_2$, of approximately 0.2 eV below the conduction band. See, A. H. Sommer, *Hypothetical Mechanisms of Operation of the Ag-O-Cs Photocathode Involving the Peroxide Cs$_2$O$_2$*, J. Appl. Phys. Vol. 51, (1980) pages 1254-55. Alternatively, the materials may be doped more heavily n or p type, thereby altering these parameters, by other dopants; e.g. As and B, respectively. Additionally, other photoemissive materials are known which are composed of heavily doped semiconductors such as Si, with a cesium or cesium oxide layer to reduce the work function. Accordingly, the present invention is not limited to the specific photoemissive materials listed in Table 1 but includes other photoemissive materials having suitable properties.

TABLE 1

| Photoemissive Material | Typical Thermionic Emission (A/cm$^2$) at 25° C. | $E_G$(eV) | $E_A$(eV) |
|---|---|---|---|
| Alkali Antimonide Materials | | | |
| Cs$_3$Sb | $<10^{-16}$ | 1.6 | .45 |
| Cs$_3$Sb(on MnO) | $10^{-15}$ | 1.6 | .45 |
| Li$_3$Sb | — | 1.0 | — |
| Na$_3$Sb | — | 1.1 | 2.44 |
| K$_3$Sb | — | 1.4 | .9 |
| Rb$_3$Sb | — | 1.0 | 1.2 |
| Bialkali Antimonide Materials | | | |
| Na$_2$KSb | $<10^{-17}$ | 1.0 | .75 |
| K$_2$CsSb | $<10^{-17}$ | 1.0 | .90 |
| K$_2$CsSb(O) | $>10^{-16}$ | 1.0 | 1.1 |
| Multi-alkali Antimonide Materials | | | |
| (Na$_2$KSb)Cs | $10^{-15}$ | 1.0 | .35 |
| K—Cs—Rb—Sb | $10^{-15}$ | — | — |
| Cesiated III - V Semiconductor Materials | | | |
| GaAs:Cs—O | $<10^{-13}$ | 1.4 | <0 |
| GaAsP:Cs—O | $10^{-17}$ | — | <0 |
| In$_x$Ga$_{1-x}$As:Cs—O (x = .05–.20) | $10^{-13}$–$10^{-14}$ | 1.18–1.24 | <0 |
| InGaAsP:Cs—O | — | — | <0 |

TABLE 1-continued

| Other Photoemissive Materials | | | |
|---|---|---|---|
| Ag—Bi—O—Cs | $<10^{-13}$ | — | — |
| Ag—O—Cs | $10^{-12}$ | — | — |
| Ag—O—Rb | — | — | — |
| Cs$_2$O:Cs$_2$O$_2$ | — | — | — |
| Cs$_2$O | — | 2.0 | .8 |

The layer of photoemissive material 26 on dynode 18 may be formed by any one of a number of well-known methods employed in forming photocathodes, the specific method depending on the photoemissive material. For example, techniques for forming alkali metal-antimonide photoemissive materials and cesiated III - V semiconductive photoemissive materials are described in A. H. Sommer, *Photoemissive Materials* (Robert E. Krieger publishing Co., New York, 1980) ; W. E. Spicer, *Negative Affinity III - V Photocathodes: Their Physics and Technology*, Applied Physics, volume 12, pages 115-130 (1977); and I. P. Csorba, *Image Tubes* (Howard W. Sams and Co., 1985) pages 218-226, the disclosure of which is incorporated herein by reference.

Figure 8:
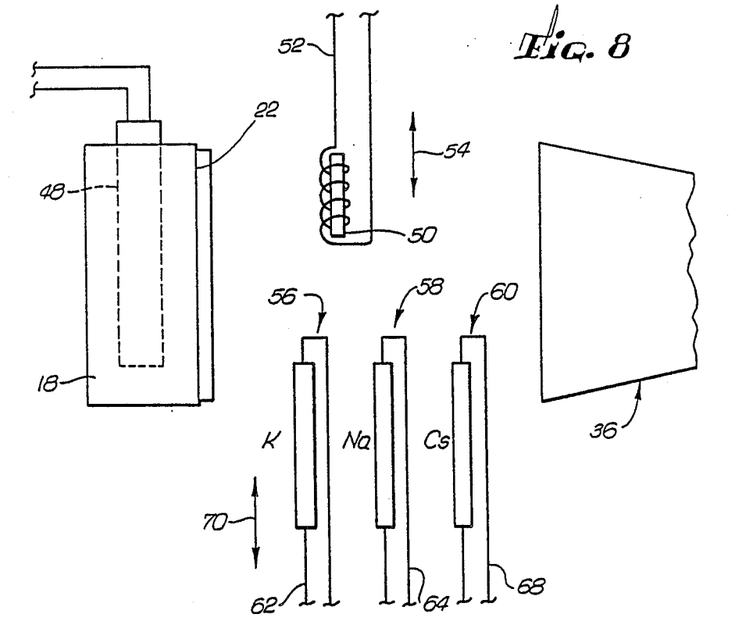
FIG. 8 is a schematic drawing illustrating one embodiment of a means for forming a multi-alkali antimonide photoemissive layer on the dynode surface.

In FIG. 8, a suitable system is illustrated for formation of alkali antimonide, bialkali antimonide or multi-alkali antimonide photoemissive surfaces on the surface 22 of metal dynode 18. In a preferred embodiment, the photoemissive material is deposited on the surface 22 of dynode 18 in a vacuum chamber within the ion detection system 14. Thus, the apparatus illustrated in FIG. 8 are preferably configured within the ion detection system 14 illustrated schematically in FIG. 3. Alternatively, the dynode 18 may be prepared with layer 26 prior to mounting in the detection system 14. In such case a variety of alternate techniques, including molecular beam epitaxy and liquid phase epitaxy may also be readily employed.

Referring to FIG. 8, dynode substrate 18 is shown provided with a cartridge heater 48 to maintain the substrate at suitable deposition temperatures during the antimony and alkali metal depostion steps. To prepare, for example, a multi-alkali Na$_2$KSbCs photoemissive material, the dynode surface 22 is first coated with a thin antimony film by heating a bar or wire of antimony metal 50 which is encapsulated in a heating coil 52. The heating coil 52 is energized to heat and vaporize a portion of metal bar 50 so as to provide the desired thickness of antimony on dynode surface 22; for example, a layer of antimony of several hundred Angstroms to several thousand Angstroms may be employed. As illustrated by double ended arrow 54, the antimony metal bar 50 and heating coil 52 may be selectively retracted away from the dynode surface 22 during operation of the ion detection system so as not to interrupt the path of the incident ion beam to be detected, or the secondary negatively charged particles given off from the dynode surface 34. In this regard, CEM detector 36 is illustrated schematically in cross section indicating the general direction of secondary negatively charged particle emission.

Subsequently to the deposition of the thin antimony film, the alkali metals K, Na and Cs are alternately deposited in the appropriate stoichiometric ratios on the antimony film on dynode surface 22. During such depositions dynode 18 and dynode surface 22 are heated via heater 48 to a suitable deposition temperature, for example, approximately 200° C. The alkali metals K, Na and Cs may be deposited employing alkali metal dispensers 56, 58 and 60, respectively, illustrated in FIG. 8. Suitable alkali metal dispensers are commercially available, for example, from SAE Getters/USA, Inc., Colorado Springs, Colo. In such a dispenser the alkali metal is vaporized by providing current through wires illustrated schematically in Figure 8 by wires 62, 64 and 68, respectively. As indicated by arrow 70, the alkali metal dispensers 56, 58 and 60 are also retractable so as to be removable from the path of the ion beam and secondary negatively charged particles after deposition of the photoemissive film.

As discussed in, for example A. H. Sommer, *Photoemissive Materials*, above, other methods may also be employed for depositing multi-alkali antimonide photoemissive materials and such methods may alternatively be employed in forming the photoemissive layer on dynode surface 22.

Figure 9:
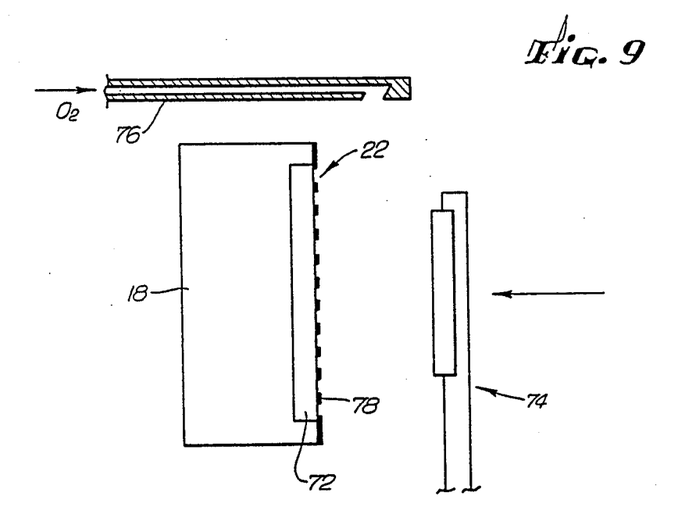
FIG. 9 is a schematic drawing illustrating one embodiment of a means for forming a cesiated III - V semiconductor photoemissive layer on the dynode surface.

In FIG. 9, one embodiment of an apparatus for forming III - V semiconductor negative electron affinity photoemissive materials on the dynode substrate 18, is illustrated. For example, to provide a gallium arsenide:-cesium oxide photoemissive material, a gallium arsenide wafer 72 may be mounted on surface 22 of dynode substrate 18. Suitable wafers of gallium arsenide are commercially available; for example a p doped single crystal GaAs wafer 3-5 millimeters thick may be employed. Alternatively, the wafer of gallium arsenide may be grown by the Czochralski technique and ion implanted with zinc. The cesium oxide layer is next formed on the single crystal gallium arsenide wafer 72 by providing cesium from a cesium dispenser 74, such as described above in relation to FIG. 8, and oxygen from a small gas inlet tube 76. Additionally, due to the relatively thick gallium arsenide wafer 72 over the surface 22 of metal dynode 18 the electrostatic field of dynode 18 which attracts the ions may be reduced. Accordingly, a high transparency metal grid 78 is optionally provided on the exposed surface of gallium arsenide wafer 72 to increase the potential at such surface.

Other techniques for providing a cesiated III - V semiconductor layer on dynode surface 22 may also be employed, for example as discussed in W. E. Spicer, *Negative Affinity III - V Photocathodes*, above.

While the present invention has been described in terms of the presently preferred embodiment, it will be appreciated that the present invention is equally applicable to a wide variety of alternate embodiments. For example, while the ion detection system of the present invention has been described in a preferred application in an improved mass spectrometry system employing a source of ionized biomolecules, or other ion source providing ions with high electron affinity constituents, it should be appreciated that significant improvements may also be achieved in mass spectrometry applications involving other types of ions, and in various applications involving detection of a wide range of ion types and masses outside of the mass spectrometry field. Additionally, while the preferred embodiment has been described in terms of a specific configuration of detector, target and electron multiplier in relation to the ion beam and with respect to each other, many different configurations are possible. Similarly, while specific preferred voltage values have been described for the target bias potential and the electron multiplier detector bias potential, considerable variation in these values is possible while still remaining within the scope of the present invention. Specifically, the optimum potential difference between the target and electron multiplier detector will vary with the specific electron multiplier detector employed and with the specific biomolecules analyzed. Similarly, the temperature at which the target is maintained may be varied through a considerable range including both cooling below room temperature and heating above room temperature. Furthermore, the present invention is not limited to the specific photoemissive materials listed and other materials with the properties of such materials of relatively low work function and good photoemissivity may be employed. Additionally, with respect to the manner in which the low work function photoemissive material is formed on the target material, many modifications are possible while remaining within the scope of the present invention.

It will be apparent to those skilled in the art that other changes in the details of the preferred embodiment described may be made and such alternate embodiments are within the scope of the present invention.

What is claimed is:

1. An ion detection system, comprising:
   means for providing a beam of ions;
   target means for intercepting said ions and ejecting secondary negatively charged particles, comprising:
      a target substrate having a first major surface oriented so as to intercept said ion beam;
      means, coupled to said target substrate, for maintaining said target substrate at a first bias potential; and
      a layer of photoemissive material substantially coating the first major surface of said target substrate, said photoemissive material having a band gap energy in the range of from 1-2 eV and an electron affinity of less than 1 eV; and
   detection means, configured with respect to said target so as to receive the secondary negatively charged particles ejected from said target means, for detecting said secondary negatively charged particles and for providing an electrical signal corresponding to said detected secondary particles.

2. An ion detection system as set out in claim 1, wherein said photoemissive material is a bialkali antimonide compound.

3. An ion detection system as set out in claim 1, wherein said photoemissive material is a multi-alkali antimonide compound.

4. An ion detection system as set out in claim 3, further comprising means for providing alkali metal vapor and means for providing antimony vapor disposed adjacent said first major surface of said target substrate.

5. An ion detection system as set out in claim 1, wherein said photoemissive material is a III - V semiconductor compound coated with a layer of cesium oxide.

6. An ion detection system as set out in claim 1, wherein said means for providing a beam of ions comprises a source of biomolecular ions.

7. An ion detection system as set out in claim 1, wherein said photoemissive material is an alkali antimonide compound.

8. An ion detection system as set out in claim 1, further comprising means for cooling said target below room temperature.

9. An ion detection system as set out in claim 1, wherein said photoemissive material has a thermionic emission of less than $10^{-14}$ A/cm$^2$ at 25° C.

10. An improved detector for detecting an incident beam of ions, comprising:
   means for shielding a portion of said detector means from said incident ion beam and for collimating said ion beam;
   a dynode positioned so as to intercept said incident beam of ions, said dynode comprising a dynode substrate and a dynode surface;
   a thin layer of low work function photoemissive material on said dynode surface, wherein said photoemissive material is selected from the group consisting of $Cs_3Sb$, $K_3Sb$, $Rb_3sb$, $Na_2KSb$, $(Cs)Na_2KSb$, $K_2CsSb$, $K_2CsSb(O)$; and
   detector means for detecting secondary negatively charged particles emitted from said dynode.

11. A detector as set out in claim 10 wherein said means for detecting comprises an electron multiplier detector having an anode and cathode, and wherein said anode has a first detector potential applied thereto and said cathode has a second detector potential applied thereto which is more positive than said first detector potential.

12. A detector as set out in claim 11 wherein said predetermined target bias potential is more negative than said first detector potential applied to said anode by a potential difference corresponding to an energy provided to said secondary ions and electrons upon acceleration through said potential difference which provides maximum detection efficiency by said electron multiplier detector.

13. A detector as set out in claim 12, wherein said target bias potential is approximately $-2.5$ kV, said first detector potential is approximately $-2.0$ kV, and said second detector potential is ground.

14. A detector as set out in claim 12, wherein said target bias potential is approximately $+2.0$ kV, said first detector potential is approximately $+2.5$ kV, and said second detector potential is approximately $+4.5$ kV.

15. A detector as set out in claim 10 further comprising means for providing alkali metal vapor positioned adjacent said dynode surface.

16. A detector as set out in claim 10 wherein said target substrate is composed of Ni.

17. An improved detector for detecting an incident beam of ions, comprising:
   means for shielding a portion of said detector means from said incident ion beam and for collimating said ion beam;
   a dynode positioned so as to intercept said incident beam of ions, said dynode comprising a dynode substrate and a dynode surface;
   a thin layer of low work function photoemissive material on said dynode surface, wherein said photoemissive material is selected from the group consisting of GaAs:Cs, GaAs:CsO, InGaAs:CsO, GaAsP:CsO, $In_xGa_{1-x}As$:CsO (x=0.05–0.20), InGaAsP:CsO; and
   detector means for detecting secondary negatively charged particles emitted from said dynode.

18. A detector as set out in claim 17 further comprising means for providing cesium vapor retractably positioned adjacent said dynode surface and means for providing oxygen positioned adjacent said dynode surface.

19. An improved detector for detecting an incident beam of ions, comprising:
   means for shielding a portion of said detector means from said incident ion beam and for collimating said ion beam;
   a dynode positioned so as to intercept said incident beam of ions, said dynode comprising a dynode substrate and a dynode surface;
   a thin layer of low work function photoemissive material on said dynode surface, wherein said photoemissive material is selected from the group consisting of $Cs_2O:Cs_2O_2$, Ag-Bi-O-Cs, Ag-O-Cs, Ag-O-Rb; and
   detector means for detecting secondary negatively charged particles emitted from said dynode.

20. A method for improving the detection of a beam of organic ions by an ion detector of the type having a dynode for intercepting the beam of ions and generating secondary negatively charged particles, said dynode having a first major surface, comprising the steps of:
   coating said first major surface of said dynode with a layer of a photoemissive material, said photoemissive material having a work function of less than 3 eV; and
   intercepting said beam of organic ions with said coated first major surface to generate secondary negatively charged particles thereby.

* * * * *